United States Patent [19]

Hall

[11] Patent Number: 4,811,756
[45] Date of Patent: Mar. 14, 1989

[54] SAFETY VALVE

[75] Inventor: Raymond J. Hall, Great Kingshill, United Kingdom

[73] Assignee: Compair Power Tools Limited, Bucks, England

[21] Appl. No.: 123,349

[22] Filed: Nov. 20, 1987

[30] Foreign Application Priority Data

Apr. 10, 1987 [GB] United Kingdom ............... 8708655

[51] Int. Cl.⁴ ............................................. F16K 17/26
[52] U.S. Cl. ................................. 137/498; 137/513.5; 137/516.25; 137/517
[58] Field of Search ................... 137/516.25, 516.27, 137/498, 517, 513.5

[56] References Cited

U.S. PATENT DOCUMENTS

| 2,121,936 | 6/1938 | Thomas | 137/498 |
| 2,668,555 | 2/1954 | Bartolat | 137/498 |
| 2,699,799 | 1/1955 | Wager | 137/498 |
| 3,683,957 | 8/1972 | Sands | 137/498 |

FOREIGN PATENT DOCUMENTS

| 2343645 | 3/1975 | Fed. Rep. of Germany | 137/498 |
| 2139326 | 11/1984 | United Kingdom . | |

Primary Examiner—Robert G. Nilson
Attorney, Agent, or Firm—Watson, Cole, Grindle & Watson

[57] ABSTRACT

A safety valve comprises a valve member which is movable against spring biasing force to close under a predetermined flow rate against valve seats and allow only a small bleed through the valve via slots. The housing consists of two parts which are adjustably connected together by a screw thread which includes a locking nut enabling the valve to be adjusted and set for operation over a range of different flow rates.

14 Claims, 2 Drawing Sheets

SAFETY VALVE

This invention relates to safety valves, and more particularly, though not exclusively, to safety valves for incorporation into hoses or other lines through which compressed air flows.

BACKGROUND OF THE INVENTION

Potentially dangerous situations can occur when hoses carrying compressed air become disconnected, because the end of the hose tends to flail about as a result of the compressed air blowing off. To prevent this, most compressed air systems or tools incorporate a safety valve. This often used to be a simple one-way valve. However, two-way safety valves are also known. For example British Pat. No. 2139326 discloses a two-way safety valve which has the advantage of being able to operate equally well with flows in either direction, as well as considerably facilitating tool change overs. Valves of this type can be provided in standard sizes according to the bore of the air line. Different applications, however, will demand different air pressures and flow conditions under which the valve must operate. The extent of the difference in possible pressures and flows is surprisingly large, particularly for smaller bore sizes, which necessitates the provision of a wide range of standard valves. In recognition of this problem, I have not developed an improved valve.

BRIEF SUMMARY OF THE INVENTION

The present invention provides in a safety valve for connection into a fluid pressure delivery line which comprises a housing, two openings in the housing serving as an inlet and an outlet, a valve member within the housing operable substantially to close either opening, means resiliently biasing the valve member to a position in which a flow path through the valve from one opening to the other is open, and means defining a restricted flow path therethrough, in which when flow through the valve in either direction exceeds a predetermined rate, the valve member moves from its resiliently biased position to a position substantially closing off one of the openings, while the restricted flow path-defining means permits a bleed through the one opening, the safety valve also including means for altering the distance which the valve member has to travel to its position substantially closing off one of the openings and/or for altering the biasing force of the means resiliently biasing the valve member whereby to enable the valve to be adjusted for operation over a range of predetermined flow rates.

By way of example, an embodiment of the invention will now be described with reference to the accompanying drawings.

DESCRIPTION OF THE PREFERRED EMBODIMENT

Figure 1:
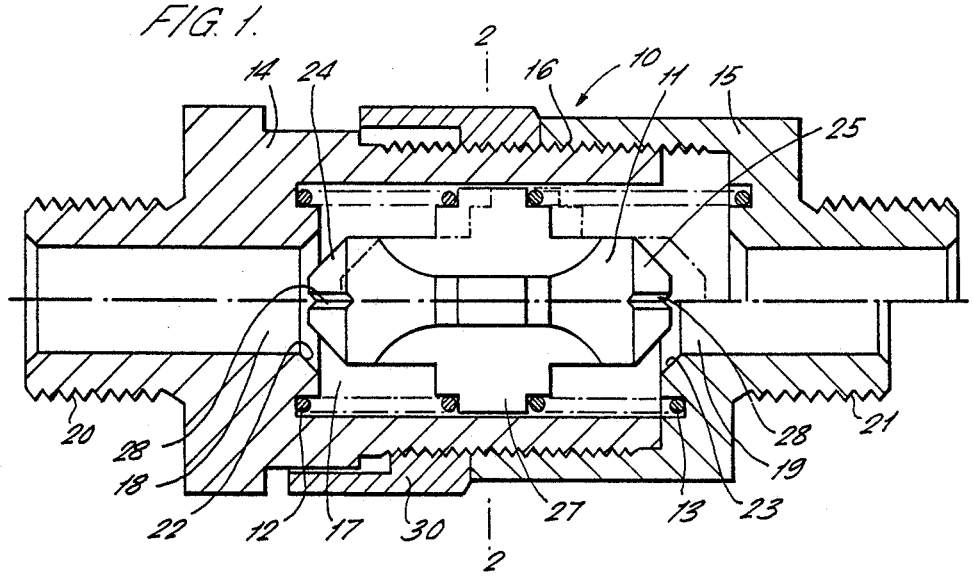
FIG. 1 is a sectional view showing a safety valve according to the invention.

A safety valve is seen in FIG. 1 comprising a housing 10, a valve member 11 and two compression springs 12 and 13. The housing 10 consists of two members 14 and 15 which are connected together by a screw thread 16. The two members of the housing together define a central cylindrical chamber 17 with openings 18 and 19 at either end. The housing 10 is suitably screw-threaded at either end (20, 21) to enable the valve to be connected into an air line. Either opening 18 or 19 may serve as an inlet and the other as an outlet, which means that the valve can be connected into the air line either way round and function equally effectively. Frusto-conical valve seats 22 and 23 are formed in the chamber 17 at each of the openings 18 and 19.

Figure 2:
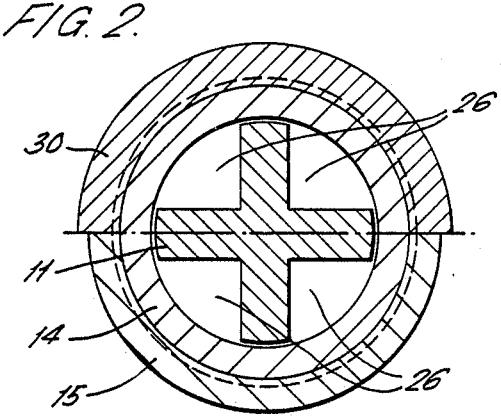
FIG. 2 shows a section through the valve.

The valve member 11 is a generally cylindrical member which is freely floating within the chamber 17. The valve member 11 is symmetrical about a central transverse plane along which the section of FIG. 2 is taken. End portions 24 and 25 of the valve member 11 are frusto-conical in shape and are dimensioned to seat in the valve seats 22 and 23 at the limits of movement of the valve member within the chamber 17. The main body of the valve member 11 is cut away, as seen at 26 in FIG. 2, so that the central portion of the valve member is generally cruciform in shape. A stepped enlarged diameter portion 27 of the valve member 11 provides shoulders on either side of the central transverse plane of the valve member against which respective ends of the springs 12 and 13 seat. The other ends of the springs 12 and 13 seat against respective end walls of the housing 10. The springs 12 and 13 here are of equal strength.

The frusto-conical ends 24 and 25 of the valve member 11 have narrow slots 28 formed therein. The purpose of these slots 28 is to provide a restricted flow path through the ends of the valve member 11 so that a bleed of air may pass through the valve when either of the end portions 24, 25 is seated against its respective valve seat 22, 23. It will be appreciated that many different configurations of valve member, valve seat and restricted flow path may be used. For example, the restricted flow path may be in the form of a pilot hole extending throughout the length of the valve member. Alternatively, the ends of the valve member may be plain, and slots or notches provided in the valve seats.

The length of the valve member 11 is less than the distance between the valve seats 22 and 23 which means that in the normal rest position, a relatively free flow of air is allowed through the valve. The cutaway portions 26 of the valve member 11 provide the necessary passages for this flow of air through the chamber 17.

It will be seen that the two members 14 and 15 of the housing 10 are each provided with a relatively extensive screw threaded portion 16. This arrangement enables the relative separation between the two members of the housing to be adjusted. The minimum separation position is indicated below the centreline in FIG. 1 and the maximum separation position above the centreline. The two members of the housing are locked together in their chosen position using a locking nut 30 once the relative separation has been adjusted as desired. To appreciate the purpose of this arrangement, it is necessary to understand how the valve works.

The valve operates on a principle of balanced and unbalanced forces. When air flows through the valve, there will be a pressure drop across the valve member.

The imbalance of forces on the valve member which this pressure drop gives rise to will tend to move the valve member in the direction of flow.

Movement of the valve member, however, will create an imbalance in the biasing forces acting on the valve member by the springs. Thus, the valve member will move until a position is reached where the imbalance in pressure forces is balanced by the imbalance of spring forces. As flow through the valve increases, so the valve member will continue to move in the direction of flow. When flow reaches a predetermined level, the valve member will have reached the limit of its movement, ie, with its frusto conical end seated on the valve seat. At this point, flow through the valve is substantially impeded, with only a small bleed being permitted through the slots in the valve member.

It will be seen that altering the relative separation of the two members 14 and 15 of the housing 10 will have the dual effect of altering the pre-load of the springs 12 and 13 and altering the clearance between the ends 24 and 25 of the valve member 11 and their respective valve seats 22 and 23. This effects how the valve will respond to variations in air flow and means effectively that the valve can be "tuned" to operate over a range of different air flows and pressures. In practice, surprisingly wide variations in air pressures and flows can arise with standard hose bore sizes, due to different systems applications. The fact that this valve is adjustable, therefore, means that it can be used for a wide range of different applications, so avoiding the need to provide a large number of standard valves.

To "tune" the valve for a particular job, the two members of the housing are firstly adjusted to their shortest separation. The separation is then gradually increased as test flows of air are passed through the valve until the point is reached where unrestricted flow through the valve is just able to be achieved. The two members of the housing are then locked in this position, simply by screwing up the locking nut, and the valve is set for that particular job. Any alteration of the flow or pressure conditions can be allowed for by simply resetting the valve.

Figure 3:
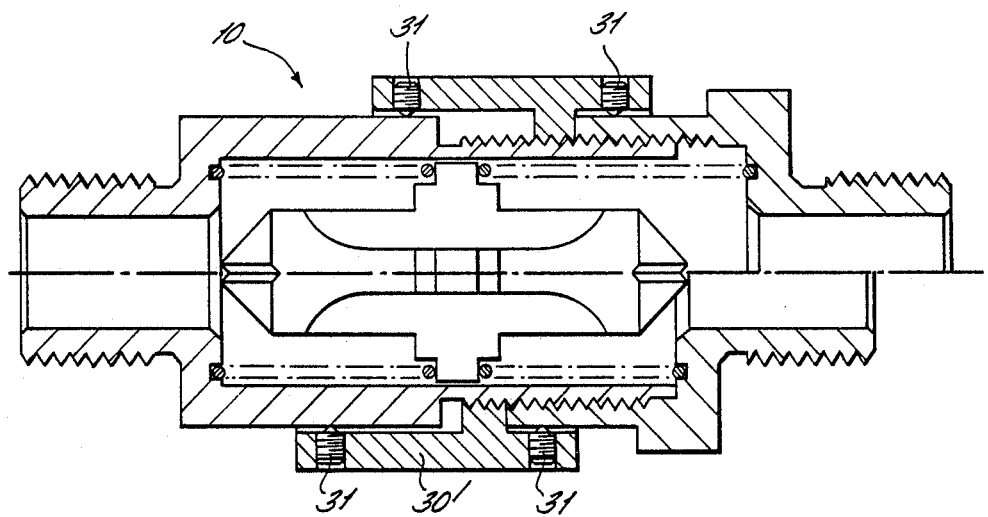
FIG. 3 is a sectional view of a modified version of the valve shown in FIG. 1.

In FIG. 3 there is seen a modification to the valve shown in FIG. 1. In the FIG. 3 valve, the locking nut 30' is provided with a number of grub screws 31 which can be tightened into engagement with the housing 10. This enables the locking nut 30' itself to be locked in position once the valve has been adjusted as desired.

It will be appreciated that it would be possible to provide a non-symmetrical version of this valve in which the two springs are of unequal strength and/or the valve member is not symmetrical so that the valve operates under different conditions in the two directions.

In use, the valve would normally be fitted to a compressed air line at the upstream end of the line adjacent to a source of compressed air. The valve would normally be downstream of a coupling connecting the hose to the source of compressed air and might be attached to part of such a coupling.

As described above, the valve will operate substantially to close off the line in the event of excessive air flow in either direction through the valve. Thus, the valve will provide protection:

(a) In the event of a hose rupture downstream of the valve, the supply of air will be cut off, thereby preventing hose whip and dangerous airblast from the ruptured end of the hose. The valve will also operate in this way in the event of excess demand at the user end of the hose caused by circumstances other than hose rupture.

(b) In the event of an operator disconnecting the airline at the user end from an air tool or other device to which the airline is connected without first shutting off the supply. The valve will then operate as described in (a) above.

(c) In the event of an operator disconnecting the airline at the supply end by disconnecting the coupling without first shutting off supply and allowing residual air to bleed from the hose. In this situation, the residual air in the hose can cause hose whip and air blast which may cause injury to the operator disconnecting the hose. In this situation, the valve will operate in the reverse direction to that described in (a) and (b) above but with the same effect of shutting off the air supply to prevent injury while allowing residual air in the hose to bleed from the valve as described above.

It will be appreciated that the two way valve described above may also be used in any situation where a one way safety valve is normally used. Thus, the valve might be used immediately upstream of a quick connect coupling which does not itself contain a safety valve feature. It will also be appreciated that the further advantage of the two way valve described above is that there is no incorrect flow direction and therefore the valve cannot be fitted into an airline the wrong way round. The valve is particularly useful in facilitating tool change overs with quick connect couplings because the bleed which is permitted through the valve acts to bring the airline quickly up to pressure.

Figure 4:
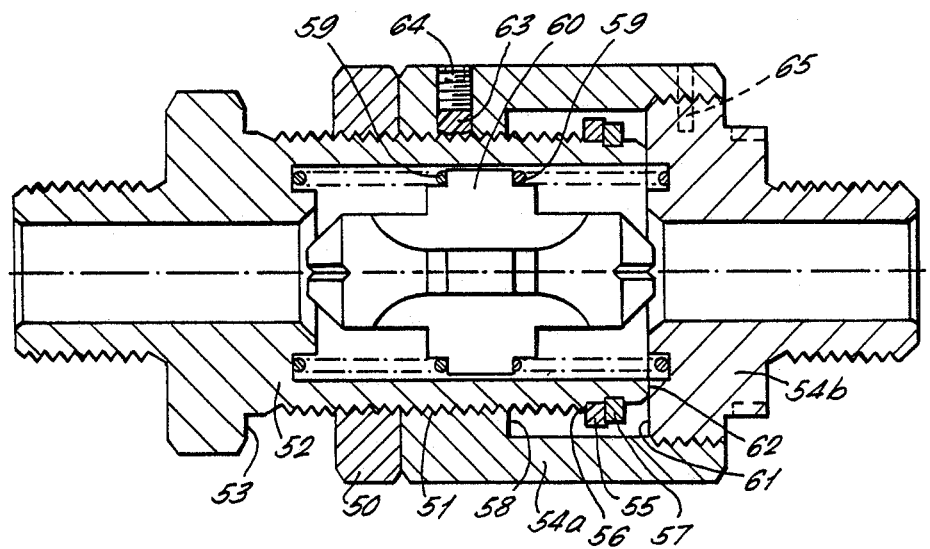
FIG. 4 is a sectional view of a further modified version of the valve shown in FIG. 1.

In FIG. 4 there is seen a further modification to the valve shown in FIG. 1. Here, means is provided to limit adjustment of the separation between the two housing members. This prevents the possibility that the two members may come apart or be dangerously loosely connected. The modified valve is assembled as follows:

Screw locknut 50 along thread 51 of housing member 52 until it is as far as possible towards face 53 of housing member 52. Screw on housing member 54a until it abuts locknut 50. Fit washer 55 against face 56 of thread 51 and fit circlip 57. Unscrew housing member 54a until face 58 abuts washer 55. Fit springs 59 and valve member 60 and screw together housing members 54a and 54b. The two housing members 54a and 54b may be fixed rigidly together by use of a thread locking compound or cross pin 65 or other locking device or left screw tight to allow the valve member 60 and springs 59 to be changed if required. If the two housing members 54a and 54b are secured permanently together, this will not allow the valve member 60 and springs 59 to be changed, which is an advantage in a safety device. The limits of the range of adjustment are when face 61 of housing member 54b abuts face 62 of housing member 52 and when face 58 of housing member 54a abuts washer 55.

The valve is set to the required cut off point as follows:

Adjust assembly of housing members 54a and 54b along thread 51 of housing member 52 to required position. Lock in selected position by use of lock nut 50. Additional locking may be provided by use of plastic plug 63 and grubscrew 64. This latter device has the advantage of locking on to the thread without thread damage. Such a device may also be incorporated into locknut 50 if required to provide additional locking.

The assembly of housing members 54a and 54b is prevented from being unscrewed from thread 51 of housing member 52 and provides not only one limit of stop adjustment but also a safety stop to prevent insufficient thread being used or complete disassembly of the housing. A form of visible graduation, e.g., external calibration marks (not shown) could be provided to give guidance on adjustment.

What I claim is:

1. In a safety valve for connection into a fluid pressure delivery line, said safety valve comprising a housing which includes two openings, a first of said two openings constituting an inlet and a second of said two openings constituting an outlet, a valve member within the housing operable substantially to close either of said first and second openings, means resiliently biasing the valve member to a position in which a flow path through the valve from one of said first and second openings to the other of said first and second openings is open, and means defining a restricted flow path therethrough, said valve member being movable from its said resiliently biased position to a position substantially closing off one of said first and second openings when fluid flow through the housing towards said one opening exceeds a predetermined rate, while the restricted flow path-defining means permits a bleed through said one opening, the improvement wherein said safety valve includes means for adjusting said housing to result in said movement of the valve member occurring at different flow rates, and locking means for releasably locking the housing in an adjusted position.

2. A safety valve according to claim 1, wherein said housing comprises first and second generally elongate parts which are longitudinally adjustably connected together.

3. A safety valve according to claim 2, wherein each of said first and second housing parts provides one of said first and second openings and defines respective first and second valve seats, and wherein said valve member includes two opposite end portions which are respectively seatable against said first and second valve seats.

4. A safety valve according to claim 3, wherein the restricted flow path comprises slots in said opposite end portions of said valve member.

5. A safety valve according to claim 2, wherein each of said first and second housing parts defines a respective spring seat, and wherein said means resiliently biasing the valve member comprises two springs which are respectively positioned against said spring seats.

6. A safety valve according to claim 5, wherein said valve member defines two opposing spring seats, and wherein the first of said two springs is positioned between the spring seat on said first housing part and a first of said two opposing spring seats on said valve member and the second of said two springs is positioned between the spring seat on said second housing part and the second of said two opposing spring seats on said valve member.

7. A safety valve according to claim 6, wherein said two springs are of equal strength.

8. A safety valve according to claim 6, wherein said locking means comprises a locking nut screw-threadedly engaged with one of said two housing parts.

9. A safety valve according to claim 8, additionally including anchoring means for releasably anchoring in position said locking means.

10. A safety valve according to claim 9, wherein said anchoring means comprising grub screws engageable between said locking means and said one housing part.

11. A safety valve according to claim 2, wherein said two housing parts are screw-threadedly connected together.

12. A safety valve according to claim 2, further comprising stop means to define the maximum limit of separation of said two housing parts and preventing disconnection thereof.

13. A safety valve according to claim 12, wherein said stop means is disengageable to permit disconnection of said two housing parts.

14. A safety valve for connection into a fluid pressure delivery line, said safety valve comprising
  a housing means defines an interior chamber, said housing being formed of first and second elongated housing parts which are longitudinally adjustably connected together, said first housing part providing a first opening for fluid medium to pass into or out of said interior chamber and a first valve seat which faces said interior chamber, and said second housing part providing a second opening for fluid medium to pass into or out of said interior chamber and a second valve seat which faces said interior chamber,
  a valve member positioned within said interior chamber to be movable therein so as to contact either said first valve seat or said second valve seat depending on the direction of fluid flow through said interior chamber,
  spring means positioned within said interior chamber to bias said valve to a position within said interior chamber such that it does not contact either of said first or second valve seats, and
  means for releasably locking said first and second housing parts in relative position after they have been longitudinally adjusted relative to one another, said longitudinal adjustment of said first and second housing parts determining the flow rate of fluid through said housing required to move said valve member into contact with one of said first and second valve seats.

* * * * *